A. H. GRUBER.
PNEUMATIC TIRE CASING.
APPLICATION FILED MAR. 30, 1917.
1,263,883.
Patented Apr. 23, 1918.
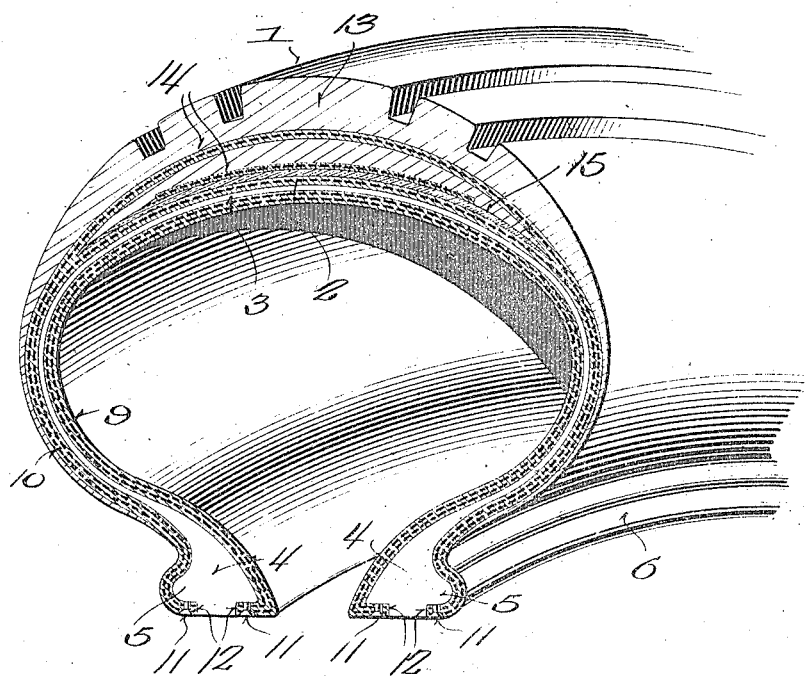
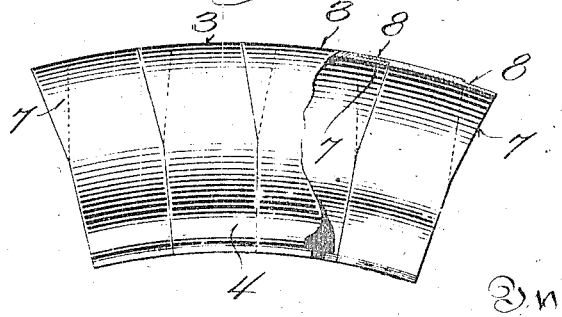

UNITED STATES PATENT OFFICE.

ARTHUR H. GRUBER, OF EVANSTON, ILLINOIS.

PNEUMATIC-TIRE CASING.

1,263,883.

Specification of Letters Patent.  Patented Apr. 23, 1918.

Application filed March 30, 1917. Serial No. 158,520.

*To all whom it may concern:*

Be it known that I, ARTHUR H. GRUBER, a citizen of the United States, and resident of Evanston, in the county of Cook and State of Illinois, have invented certain new and useful Improvements in Pneumatic-Tire Casings; and I do hereby declare that the following is a full, clear, and exact description thereof.

My invention relates to new and useful improvements in casings for pneumatic tires, the principal object being to provide a tire of this character which will be puncture and blow-out proof.

Another object is to provide a casing which will be much more resilient than the usual pneumatic tire casing with about half of the air required in the ordinary tire. It is well known that unless the air pressure of an ordinary pneumatic tire is maintained at a proper point, the life of the tire will be greatly lessened; furthermore when the tire is inflated to the proper pressure it loses a considerable amount of its resiliency which is only obtained when the tire is comparatively soft. But, when the tire is used only partially inflated it will assume a substantially transversely elliptical shape and the opposite sides will sooner or later crack so that a blow-out will occur. It is to overcome the last named defect, while at the same time to provide a tire which will have all the resiliency of a partially inflated tire, that my invention has been devised.

In addition to the other features, an additional object is to produce a tire the carcass of which may be retreaded an indefinite number of times.

With the foregoing and several other objects in view the invention resides in the novel features of construction, combination and arrangement of parts which will be, hereinafter more particularly described and claimed, and shown in the drawings wherein:

Figure 1 represents a transverse sectional view through my improved tire casing, part of said casing being shown in perspective and Fig. 2 is a side elevational view, partly in section, of a few of the spring metal plates which are used in reinforcing the body or carcass of my tire.

In the accompanying drawing, wherein similar reference characters designate like parts, the numeral 1 indicates the tread portion of a tire constructed in accordance with my invention and 2 denotes the carcass.

In building the latter a plurality of spring metal plates 3 form the foundation upon which sheets of fabric are cemented. From Fig. 1 it will be noted that in edge view each plate is substantially U-shaped, the main portions being approximately elliptical. The tread portions of the plates as well as their sides are relatively thin, while the free ends are materially thickened as shown at 4, the inner surfaces of the latter ends being conformed to the inner curvature of the tire. The outer sides of the ends 4 preferably have ribs 5 each, when covered with the above mentioned fabric form the beads 6 of the usual clencher casing. It is obvious that when straight side tires are made these ribs 5 will be omitted.

Each of the plates 3 has its tread portion transversely widened from points substantially mid-way their sides as shown at 7. The widened portion of each plate is about one-half the thickness of the other parts of the plates to provide recesses 8, and these reduced portions over-lap each other as clearly shown in Fig. 2. Each plate has one portion 7 with its outer surface cut away to provide the recess 8, while the other portion 7 has its under surface cut away so as to produce the lapped joints shown. When the plates 3 are placed together edge to edge with the portions 7 overlapping, a very strong, yet extremely resilient armor is formed which will prevent the usual inner tube from either being punctured or blowing out. It is obvious that the increased amount of resiliency is obtained by the elliptical shape of each plate. The widened portion 7 extending from the center of the opposite sides of each plate give the added strength necessary at the point of greatest strain.

Fig. 1 shows the preferred method of applying the fabric portions of the carcass to the reinforcing plates 3, and in this figure it will be noted that because of the addition of these plates the walls of the casing may be much thinner than ordinarily necessary. After the plates are placed together to form an annular body, one or more sheets of fabric 9 are cemented to the inner sides thereof, thereby providing a smooth unbroken surface for the usual inner tube. Similar sheets of fabric 10 are secured to the outer surfaces of the plates 3, and upon the tread surface of these the tread 1 is vulcanized.

The inner edges of the fabric sheets 9 and 10 are preferably secured to the thickened portions 4 of the plates 3 by means of rivets or other fastening elements 11. From Fig. 1 it will be seen that these ends 4 of the plates are recessed to provide shoulders 12 against which the edges of the fabric strips abut. Thus a portion of each metallic plate 3 will be exposed for engagement with the metal surface of the retaining rim which holds the casing and inner tube to the vehicle wheel. Although more or less heat is always generated by the friction of the tires with the road surface, especially where such tires contain metallic reinforcing or puncture proof plates, by providing the exposed parts of the plates of my invention and permitting same to engage the metallic retaining rim it will be seen that the heat will not collect in the carcass of the tire, but will travel from the ends 4 of the plates and be distributed through the retaining rim.

The tread portion 1 of my improved casing may be constructed of any preferred rubber composition 13 with fabric reinforcings 14. Added resiliency is obtained by placing a strip of pure rubber between the tread portion 1 and the carcass 2. The plates 3 retain the carcass of the tire substantially elliptical in transverse cross section, the axis of the ellipse being disposed parallel with the axis of the center of rotation of the tire, or in other words, with the axle of the wheel on which the casing is mounted. This gives an added resiliency to the tire which is not possible in a tire of ordinary shape, as hereinbefore set forth. But since it is advisable to procure a so called one point contact with the road surface, the tread surface 13 is added, the same being relatively thin at its edge portions and rather thick in its central portion, whereby the tread portion of the casing assumes a substantially semi-circular shape in transverse cross section.

From the foregoing description taken in connection with the accompanying drawing it will be seen that a very efficient puncture and blow-out proof casing has been produced, an important part of the invention consisting of the provision of a plurality of annularly disposed spring metal plates. The material of which these metallic plates are formed is not important, but it has been found by experimentation that aluminum will serve to the best advantage. Furthermore the peculiar elliptical shape of these plates in edge view permits the casing to be used with fifty per cent. less air pressure than is required in any pneumatic tire casings of similar size.

I claim:

1. A tire casing of the class described having a body provided with a plurality of flexible resilient substantially U-shaped reinforcing plates, relatively thin throughout the major portions of their length, their opposite free end portions being materially thickened to reinforce the edges of the casing.

2. A tire casing of the class described having a body comprising a plurality of flexible resilient substantially U-shaped reinforcing plates, relatively thin throughout the major portions of their length, their opposite free end portions being materially thickened to reinforce the edges of the casing, said thickened portions being recessed in their inner side, and fabric sheets disposed on the inner and outer surfaces of said plates, the opposite edges of said sheets being disposed in said recesses and secured to said thickened portions.

3. A tire casing of the class described having a body provided with a plurality of flexible resilient, substantially U-shaped reinforcing plates disposed edge to edge in abutting relation, the tread portions of each of said plates being transversely widened in opposite directions, the widening portion on one side of each plate having its outer surface cut away to reduce the thickness thereof, the widening portions on the opposite sides of the plates having their inner sides cut away to reduce the thickness thereof, the adjacent widening portions being overlapped to provide continuous reinforcing surfaces of equal thickness.

4. A tire casing of the class described having a carcass substantially elliptical in transverse cross section, the axis of the ellipse being disposed paralled with the axis of the center of rotation of said casing, a plurality of reinforcing plates disposed in said casing, each of said plates being substantially elliptical in edge view similar to the transverse cross sectional shape of the carcass, and a tread portion secured to the outer surface of said carcass, said tread portion being thin at its edges and relatively thick intermediate its edges whereby the road engaging part of the casing is rendered substantially semi-circular in transverse cross section.

In testimony that I claim the foregoing I have hereunto set my hand at Milwaukee, in the county of Milwaukee and State of Wisconsin.

ARTHUR H. GRUBER.